Feb. 3, 1942.  G. E. DUNN ET AL  2,271,523
UNIVERSAL JOINT
Filed July 5, 1940  2 Sheets-Sheet 2
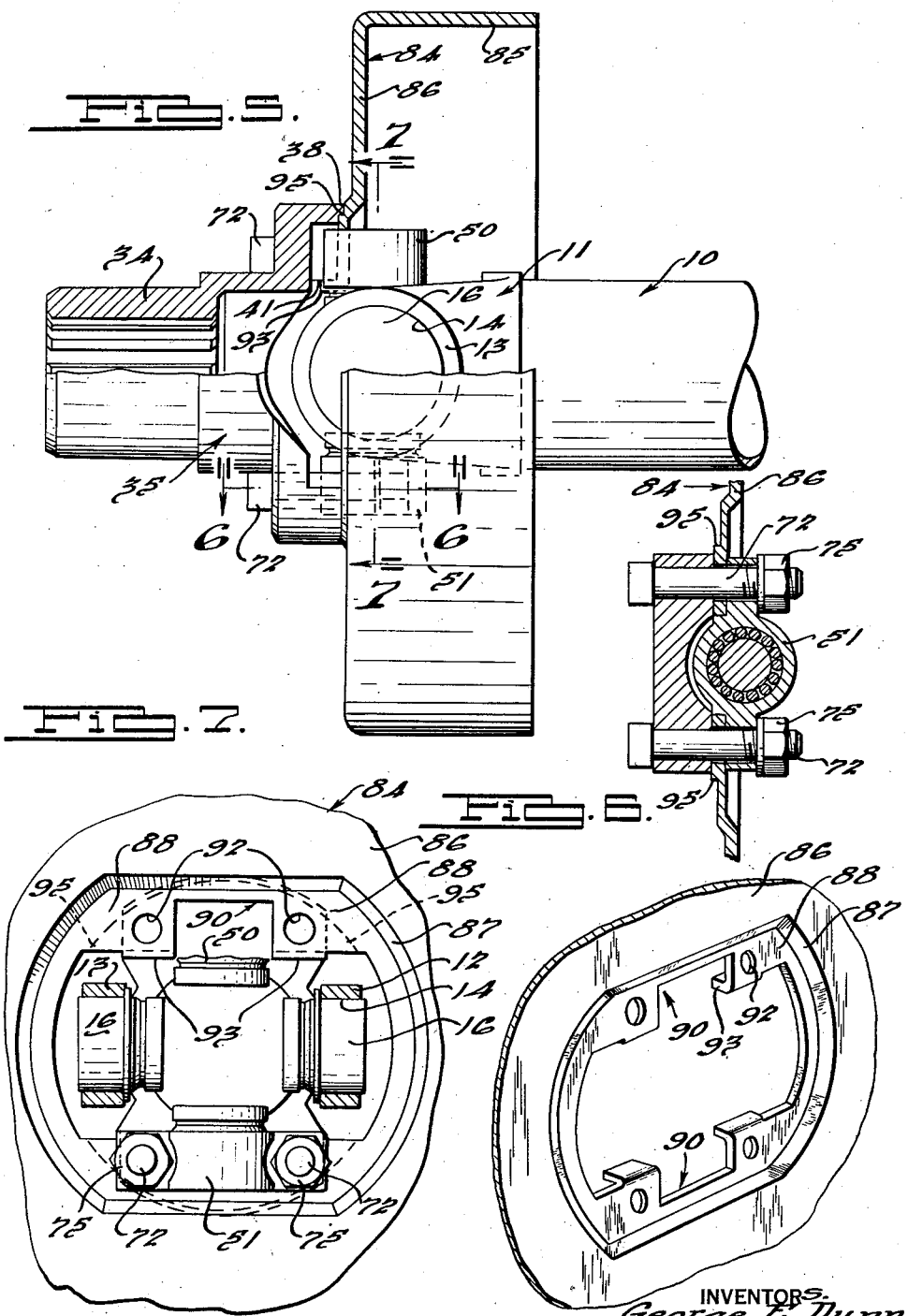
INVENTORS.
George E. Dunn.
Frank Ketcham.
BY
Harness, Dickey & Pierce.
ATTORNEYS.

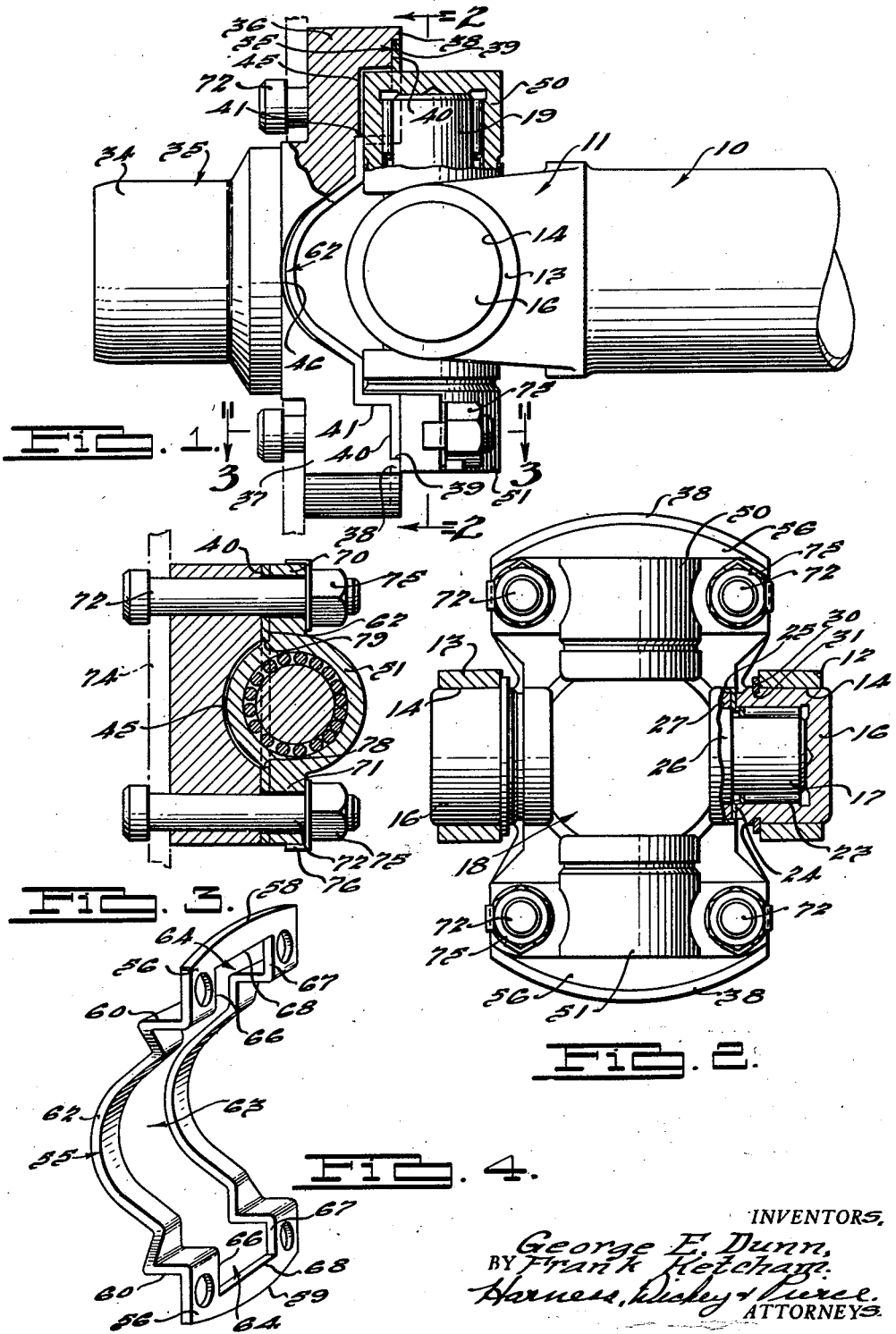

Patented Feb. 3, 1942

2,271,523

UNITED STATES PATENT OFFICE 2,271,523

UNIVERSAL JOINT

George E. Dunn and Frank Ketcham, Dearborn, Mich., assignors to Universal Products Company Incorporated, Dearborn, Mich., a corporation of Delaware Application July 5, 1940, Serial No. 343,940

10 Claims. (Cl. 64—17)

This invention relates to joints and it has particular relation to universal joints of the four trunnion type.

With respect to universal joints as used on automobiles, several factors of importance must be considered aside from the efficiency and durability of the joint. One of these is the cost factor and it will be readily appreciated that any reduction in the cost necessarily becomes a highly important item, for the reason that an enormous number of universal joints are used in the manufacture of automobiles. Another important factor is that of the cost of assembly of the joint and the assembly thereof with other parts of the automobile with which they are associated. Ordinarily, a spline type of transmission shaft with a universal joint on each end is supplied to the automobile manufacturer and it is important that the latter be enabled to assemble the joints with other drive shafts to complete the driving transmission, and that the assembling operations be effected with minimum effort and time requirements. Anything that promotes the speed of assembly and requires less effort naturally involves a saving of considerable time and expense on the part of the automobile manufacturer.

One object of the present invention is to provide an improved universal joint of knock-down character, which may be assembled more efficiently and more easily, to the end that the cost of the automobile may be reduced accordingly.

Another object of the invention is to provide a joint of this particular character which may be manufactured less expensively by the joint manufacturer, while still enabling the manufacturer to obtain precision in the fitting of different parts together.

Another object of the invention is to provide an improved universal joint of the aforesaid character which may be manufactured by simple, inexpensive manufacturing methods, to the end that the cost of constructing the joint will be lowered.

Another object of the invention is to provide a method of assembling universal joints of knock-down character which will enable line assembly thereof to be effected in an easier manner and in a reduced amount of time, all to the end that time and effort factors will be decreased.

Another object of the invention is to provide an improved method of sub-assembling a universal joint whereby the parts will be retained in proper place during handling and shipping and also in correct relation for final assembly with other parts to be connected thereto.

Another object of the invention is to provide an improved type of joint which includes a brake drum.

Another object of the invention is to provide an improved joint including a brake drum, which has the objects and advantages set forth in the preceding objects of invention.

Other objects of the invention will become apparent from the following specification, from the drawings to which it relates, and from the claims hereinafter set forth.

For a better understanding of the invention, reference may be had to the drawings, wherein:

Figure 1 is an elevational view, partly in cross-section, illustrating a universal joint constructed according to one form of the invention;

Fig. 2 is a cross-sectional view taken substantially along the line 2—2 of Fig. 1;

Fig. 3 is a cross-sectional view taken substantially along the line 3—3 of Fig. 1;

Fig. 4 is a detail view illustrating a plate adapted to extend between diametrically opposed bearing blocks in the joint illustrated;

Fig. 5 is a view on the order of Fig. 1, illustrating another form of the invention including a brake drum;

Fig. 6 is a cross-sectional view taken substantially along the line 6—6 of Fig. 5;

Fig. 7 is a cross-sectional view taken substantially along the line 7—7 of Fig. 5; and, Fig. 8 is a fragmentary view illustrating the brake drum member separated from the assembly.

Referring to Fig. 1 first, the assembly shown includes a shaft 10 and it is to be understood that normally this shaft will be provided with a spline to permit shortening and lengthening of the shaft during operation of the automobile. That end of the shaft shown has a yoke 11 and, as best shown by Fig. 2, the yoke has diametrically opposed arms 12 and 13, which are apertured, as indicated at 14, for receiving bearing cups 16. These bearing cups respectively receive diametrically opposed trunnions 17 of a cross 18 and between the side wall of each cup and its trunnion, small rollers 23 are provided. An annular retaining ring 24 having a press fit engagement with the inner surface of the cup retains the rollers in the cup. An annular ring 25 of channel shape cross-section has its inner wall press fitted on a larger base portion 26 of the trunnion and the outer wall of the ring overlaps the side wall of the bearing cup so as to prevent dirt, water, and the like from entering the bearing. A packing 27, which may be constructed of cork, felt, or other suitable material, is disposed within the channel of ring 25 and contacts the retaining element 24 so as to prevent lubricant leakage from the bearing.

A split ring 30 seated in a groove 31 in the wall of each cup and adapted to abut the inner side of the yoke arm retains the cups in position and it should be understood that before the rings are applied, the cups are inserted endwise from the outer side of the yoke arm. It will be observed that the rings 30 locate the bearing cups with respect to the yoke arms and that the end walls of the cups substantially contact the ends of the trunnions, from which it follows that the cross may be centered with respect to the axis of the joint.

The foregoing description deals only with the yoke arm fastened or mounted on the shaft 10 and the opposed trunnions and bearing cups associated therewith. The present invention is primarily concerned with the other trunnions and bearing cups of the joint and the association of such parts with a second yoke in a knockdown manner. In the instance shown, the second yoke may be mounted on a driven shaft projecting from the engine transmission casing.

Referring again to Figure 1 in particular, the second yoke is indicated at 35 and includes a cylindrical portion 34 to be fixed on the projecting end of the engine transmission shaft. The yoke has diametrically opposed arms 36 and 37, and each of the arms has an overhanging outer shoulder 38 provided with an inner arcuate surface 39, with the center of curvature of such surface located on the joint axis. Immediately inward of the surface 39, each of the arms has a flat surface 40 which extends to an inner shoulder 41, which is substantially straight or, in other words, it is not arcuate.

As best shown by Fig. 3, the face 40 is interrupted centrally by a curved recess 45 which extends from the shoulder 41 to a point substantially inward of the arcuate shoulder 39. Between the two arms 36 and 37 of the yoke, the latter is cut back as indicated at 46 in Fig. 1 and one reason for this recess is to provide room for the movement of the yoke arms 12 and 13 on yoke 11 during operation of the joint.

The cross 18 of the joint has its other diametrically opposed trunnions 19 projecting into bearing blocks 50 and 51 which are mounted on the trunnions in the same manner as the bearing cups 16 and 17 previously described. It is to be understood, therefore, that the bearing blocks 50 and 51 are related to the trunnions and have the same bearing sealing means as described with respect to the trunnions associated with the bearing cups 16 and 17, although in the case of the bearing blocks, split rings 30 are not employed for holding the blocks in position.

Attention is now directed to a plate 55 which is, as best shown by Fig. 4, provided with flat end portions 56 adapted to fit against the surfaces 40 on the yoke arms, and arcuate end edges 59 adapted to fit the arcuate surfaces 39 on the yoke arms. Also, the plate has shoulder portions 60 adapted to project under the shoulders 41 on the yoke arms, although it might be mentioned here that a slight clearance may be found preferable at these shoulders in order to insure contact between the arcuate shoulders 39 and edges 59. The intermediate portion of the plate is bowed, as indicated at 62, so as to approximate the contour of recess 46 of the yoke although some clearance is present. The plate intermediate its side edges is open as indicated at 63 and the opening extends into the end portions 56 to provide generally rectangular recesses 64. Each of the recesses in the flat end portions of the plate has side edges 66 and 67 and an outer edge 68 and it will be noted in Figs. 1 and 3 that these edges are so related to the sides of the recesses 45 in the yoke arms that they project slightly inwardly of the sides of the recesses.

Now, directing attention particularly to Fig. 3, each of the bearing blocks 50 and 51 has laterally projecting wings 70 and 71, apertured for receiving fastening bolts 72 adapted to secure the blocks to the yoke arms, and these also extend through openings in the end portions 56 of the plate so that the bolts hold the yoke arms, plate, and bearing blocks together. A brake drum flange 74 may be secured to the yoke at the opposite side of the yoke arms by cylindrical bolts 72. Such bolts are inserted from the brake drum side and are provided with threaded ends having nuts 75 and lock washers 76 thereon for retaining the parts together. In order to accurately center the brake drum, the bolts have a close fit in the brake drum and yoke openings as shown while conversely in order to prevent the bolts from undesirably taking torque load, the bolts have a relatively loose fit in the openings in plate 55 and the bearing blocks 50 and 51.

It is to be observed that the bearing block projects into the recess 45 but does not contact with the wall of the latter and that at opposite sides, the blocks have shoulders 78 and 79 adapted to drivingly contact the side edges 66 and 67 of the plate 55. At their outer ends, the bearing blocks contact the edges 68 of the plate and this contact holds the blocks against outward radial movement.

In so far as assembly is concerned, the joint manufacturer after assembling the yoke 11 with the cross, may place the bearing blocks 50 and 51 on their trunnions and then plate 55 may be applied over the bearing block in a snap action manner, it being apparent that the resiliency of the plate will permit this operation. Normally, therefore, the plate will be so arranged that it will be necessary to spread the end portions 56 and 57 apart to apply them over the end faces of the blocks and it follows that when the plate is applied, resilient pressure will normally urge the blocks toward the center of the joint. When the bearing blocks are first applied over the trunnions, contact of the inner ends of the blocks with the packing 27 will resiliently resist final movement of the blocks and thus the resilient nature of the plates will simplify application of them even though the packing 27 resists final inward movement of the blocks. From this it will be seen that the plate and blocks will be rather positively held assembled, so that the joint manufacturer may supply an assembly and yoke which may be readily associated simply by movement of the assembly axially of the yoke, although some pressure may be required to press the blocks slightly inwardly towards the joint axis so as to permit movement of the edges 59 of the plates under the arcuate shoulders 39 of the yoke arms. Accuracy in the dimension between each end edge 59 and the adjacent inner edge 68 of plate, accuracy in the length of the trunnions, accuracy in the thickness of the end walls of the cups, and accuracy in the location and finishing of the arcuate surfaces 39 of the yoke arms, are important, and with this accuracy, it will be apparent that the bearing blocks can be accurately positioned so as to provide the necessary radial thrust contacts and a centered relation of parts. Assembly of the universal joint with the yoke arms is thus facilitated by using of the plate, while at the same time obtaining a precision fit. Finishing of the different surfaces where precision is required may be easily accomplished by machining operations suitable for this purpose and as for the plates 55, this can be easily fabricated by stamping and pressing operations.

It is intended that the flat face frictional contact between the bearing blocks, the plate, and the yoke arms, as maintained by the bolts, be ample to take care of torque driving forces without permitting any such movement as to place the torque load on the bolts. In this connection, it is to be noted that the blocks have torque driving engagement with the edges 66 and 67 of the plate and that they do not contact the yoke arms. However, attention may be directed to the fact that the shoulders 60 on the plate would contact the shoulders 41 on the yoke arms if any slight movement of the plate relative to the arms should occur.

Heretofore it has been stated that the plates resiliently urge the blocks radially inward, but that some pressure possibly may be required to press the blocks slightly farther towards the joint axis to permit the edges 59 of the plates to move under the arcuate shoulders 39 of the yoke arms. Suitable equipment may be used for effecting this additional, slight movement at the time the yoke is to be assembled with the other parts that have been pre-assembled or it may be preferred for the joint manufacturer to press the blocks inwardly the slight amount required and then use a removable clamp in addition to the spring action of the plate for holding the blocks positively in position prior to such final assembly.

Referring now to Figs. 5, 6, 7 and 8, instead of the adaptor plate 55 employed in the previously described structure, a brake drum member 84 is employed which has a rim or brake flange 85 and a radial web 86. As best shown by Fig. 8, the web at its inner edge, is embossed or countersunk as indicated at 87, and this embossed portion has a flat or radial portion 88. At diametrically opposite sides, the flat portion 88 has rectangular recesses 90 corresponding to the recesses 64, 64 in the plate 55 shown by Fig. 4, and these recesses are adapted to have the same relation to the yoke recesses and bearing blocks as described in connection with the plate 55. Openings 92 are provided at the sides of the recesses 90 for receiving the bolts 72 and these openings and the openings in the wings of the bearing blocks are slightly larger than the bolts to avoid torque load directly on the bolts.

Inwardly of each opening 92, the metal is bent over as indicated at 93 and such bent over portions are adapted to lay substantially close to the shoulders 41 on the yoke arms so that engagement between such bent over portions and shoulders would occur if slight turning of the brake drum relative to the yoke should occur. Thus, the bent over portions provide a means for positively stopping any relative movement such as mentioned and they may be arranged to positively prevent such movement of the plate and bearing blocks as would cause such parts to impart torque forces to the sides of the bolts.

For centering the brake drum and bearing blocks on the yoke, the web of the drum is formed with a circular shoulder 95 adapted to accurately fit under the shoulders 38 on the yoke arms. These shoulders may be accurately formed by turning machines suitable for this purpose, after the web has been shaped and cut as shown in Fig. 8. It may be observed in this figure that the central part of the plate is removed to provide the necessary clearances for the other yoke 11.

In utilizing this structure, the brake drum is fabricated and then associated with the bearing block assembly in the same way in which the plate 55 is used. Hence the joint manufacturer may supply an assembly adapted to be rapidly brought into operative relation to the yoke 35 on the assembly line of the automobile manufacturer with the assurance that all parts will be accurately centered and balanced. However, the bearing blocks might be held in position on the trunnions with clamps and subsequently assembled with the brake drum by the automobile manufacturer, in the event it were found desirable to handle and ship the drum separately.

The combined plate and brake drum have several advantages. One advantage is that the drum is located at the front side of the yoke 35 and, therefore, it can be installed and replaced after the yoke 35 is fastened to the engine shaft. A second advantage is that the structure is simpler than where separate plate and brake members are employed. Again, the brake drum and bearing constitute an entity for assembly with the yoke and this simplifies and expedites the assembling operations.

Although only one form of the invention has been described in detail, it will be apparent to those skilled in the art that various modifications may be made without departing from the scope of the invention or the appended claims.

What is claimed is:

1. In a joint, a yoke having diametrically opposed arms, a member having diametrically opposed trunnions, a bearing cup on each trunnion and having radial thrust engagement therewith for holding the trunnion against radially outward movement, a plate member having end portions engaging over the outer end face of the cups on the trunnions prior to and during assembly thereof with the yoke arms, means on the yoke arms for engaging the plate member to center the latter relative to the joint axis, and means for securing the bearing cups to the yoke arms.

2. In a joint, a yoke having diametrically opposed arms, a member having diametrically opposed trunnions, a bearing cup on each trunnion and having radial thrust engagement therewith for holding the trunnion against radially outward movement, a plate member having recessed end portions respectively receiving a part of the cups and engaging over the outer end face of the latter so that the plate member holds the two cups on the trunnions and prevents radially outward movement of the cups on the trunnions, means on the yoke for centering the plate relative to the yoke or joint axis, and means for connecting the cups and plate member to the yoke.

3. In a joint, a yoke having diametrically opposed arms, a member having diametrically opposed trunnions, a bearing cup on each trunnion and having radial thrust engagement therewith for holding the trunnion against radially outward movement, a plate having spaced openings each adapted to receive one of the cups when the latter is on its trunnion, each opening having its edges substantially contacting respectively the sides of the cup and the radially outer end thereof, and means connecting the plate and cups to the yoke arms.

4. In a joint, a yoke having diametrically opposed arms, a member having diametrically opposed trunnions, a bearing cup on each trunnion and having radial thrust engagement therewith for holding the trunnion against radially outward movement, a plate member having end portions engaging the cups on the trunnion prior to and during assembly thereof with the yoke arms, means on the yoke arms for engaging the plate member to center the latter relative to the joint axis, and means for securing the bearing cups to the yoke arms, said plate having an offset intermediate portion providing a resiliency at its ends for urging the cups toward the joint axis.

5. In a joint, a yoke having diametrically opposed arms, each being provided with an outer overhanging arcuate shoulder having its center of curvature on the joint axis and also being provided with an inner overhanging shoulder spaced from the arcuate shoulder, a plate element having its ends curved to fit under the arcuate shoulders and having intermediate shoulders adapted substantially to fit under the inner shoulders, said plate at each end and between said shoulders having an opening, a trunnion member having diametrically opposed trunnions, bearing cups on the trunnions and having radial thrust engagement therewith and also having portions disposed in and substantially in contact with the edges of the plate openings respectively, and means connecting the plate, blocks and yoke arms together.

6. In a joint, a yoke having diametrically opposed arms, each being provided with an outer overhanging arcuate shoulder having its center of curvature on the joint axis and also being provided with an inner overhanging shoulder spaced from the arcuate shoulder, a plate element having its ends curved to fit under the arcuate shoulders and having intermediate shoulders adapted substantially to fit under the inner shoulders, said plate at each end and between said shoulders having an opening, a trunnion member having diametrically opposed trunnions, bearing cups on the trunnions and having radial thrust engagement therewith and also having portions disposed in and substantially in contact with the edges of the plate openings respectively, and means connecting the plate, blocks, and yoke arms together, the plate openings, block portions disposed therein and the yoke arms being so arranged that the blocks are free from any direct contact with the yoke arms.

7. In a joint, a yoke having diametrically opposed arms, each being provided with an outer overhanging arcuate shoulder having its center of curvature on the joint axis and also being provided with an inner overhanging shoulder spaced from the arcuate shoulder, a plate element having its ends curved to fit under the arcuate shoulders and having intermediate shoulders adapted substantially to fit under the inner shoulders, said plate at each end and between said shoulders having an opening, a trunnion member having diametrically opposed trunnions, bearing cups on the trunnions and having radial thrust engagement therewith and also having portions disposed in and substantially in contact with the edges of the plate openings respectively, and means connecting the plate, blocks and yoke arms together, the inner shoulders on the plate and yoke arms being closely arranged so as to obtain driving contact with each other in the event slight relative turning movement of the plate and yoke occurs.

8. In a universal joint, a yoke having diametrically opposed arms, a member having diametrically opposed trunnions, a bearing cup on each trunnion and having radial thrust engagement therewith for holding the trunnion against radially outward movement, a plate member having radial thrust engagement with each cup for preventing radially outward movement of the cups, means on the yoke arms and engaging the plate member for centering the latter relative to the joint axis, means connecting the cups to the yoke arms, and a brake element on the plate member.

9. In a universal joint, a yoke having diametrically opposed arms, a member having diametrically opposed trunnions, a bearing cup on each trunnion and having radial thrust engagement therewith for holding the trunnion against radially outward movement, plate means on the cups respectively and adapted to contact and hold the cups on the trunnions prior to securing the cup and trunnion assembly to the yoke arms, means interconnecting the plate means so as to hold each plate means and cup on the trunnion for the latter prior to said assembly, and means for securing the plate means and cups to the yoke arms including bolts extending through apertures in the plate means.

10. In a universal joint, a yoke having diametrically opposed arms, a member having diametrically opposed trunnions, a bearing cup on each trunnion and having radial thrust engagement therewith for holding the trunnions against radially outward movement, a plate means for each cup having a recess in which the cup is partially disposed so that a part of the plate means extends over the outer end of the cup, means interconnecting the plate means so as to hold the cups on the trunnions prior to assembly of the yoke therewith, and means for securing the plate means and cups to the yoke arms including bolts extending through apertures in the plate means.

GEORGE E. DUNN.
FRANK KETCHAM.